(No Model.)

G. H. P. FLAGG.
FLEXIBLE CONDUCTOR.

No. 302,718. Patented July 29, 1884.

Witnesses.
H. Brown.
A. L. White.

Inventor.
G. H. P. Flagg
by Wright & Brown
Attys.

UNITED STATES PATENT OFFICE.

GEORGE H. P. FLAGG, OF BOSTON, MASSACHUSETTS.

FLEXIBLE CONDUCTOR.

SPECIFICATION forming part of Letters Patent No. 302,718, dated July 29, 1884.

Application filed May 16, 1884. (No model.)

*To all whom it may concern:*

Be it known that I, GEORGE H. P. FLAGG, of Boston, in the county of Suffolk and State of Massachusetts, have invented certain Improvements in Flexible Conductors, of which the following is a specification.

This invention has for its object to provide a flexible conductor adapted to conduct the material known as rubber cement or other analogous material from a reservoir to the surface to which the cement is to be applied—as, for example, the sole of a boot or shoe—the cement being used to secure the flap formed on the sole in cutting the stitch-receiving channel, and to connect the sole to the upper. The flexible conductor is connected at one end to the reservoir, and provided at its free end with a fountain-brush through which the cement flows, the flexibility of the conductor enabling the brush to be freely moved about as occasion may require, as shown in Letters Patent of the United States granted to C. K. Bradford, May 22, 1883.

Rubber cement is usually composed of naphtha or other volatile hydrocarbon and rubber. It has been found that the action of the hydrocarbon contained in the cement on common rubber tubing is to weaken and disintegrate the tubing, so that it is in a very short time rendered unfit for use. This difficulty has been remedied by providing the flexible tubing with a gelatinous lining which is flexible, liquid-proof, and capable of resisting the action of the hydrocarbon. Said lining is, however, soft and easily ruptured, so that when it forms the surface of the passage through which the cement flows portions are liable to become detached from the body of the lining and obstruct the passage, so that it is necessary to insert a rod or clearer to remove the obstruction. The clearer is liable to injure the lining, particularly when it is already partially broken.

To overcome these objections and preserve the gelatinous lining is the object of my invention, which consists in providing the inner surface of said gelatinous lining with an inner lining of leather formed by skiving the edges of a strip, overlapping said edges spirally, and cementing them together, a lining being thus formed which will hold the gelatinous material in place and prevent it from breaking away, and will at the same time constitute a smooth-surfaced passage for the cement, as I will now proceed to describe.

Figure 1:
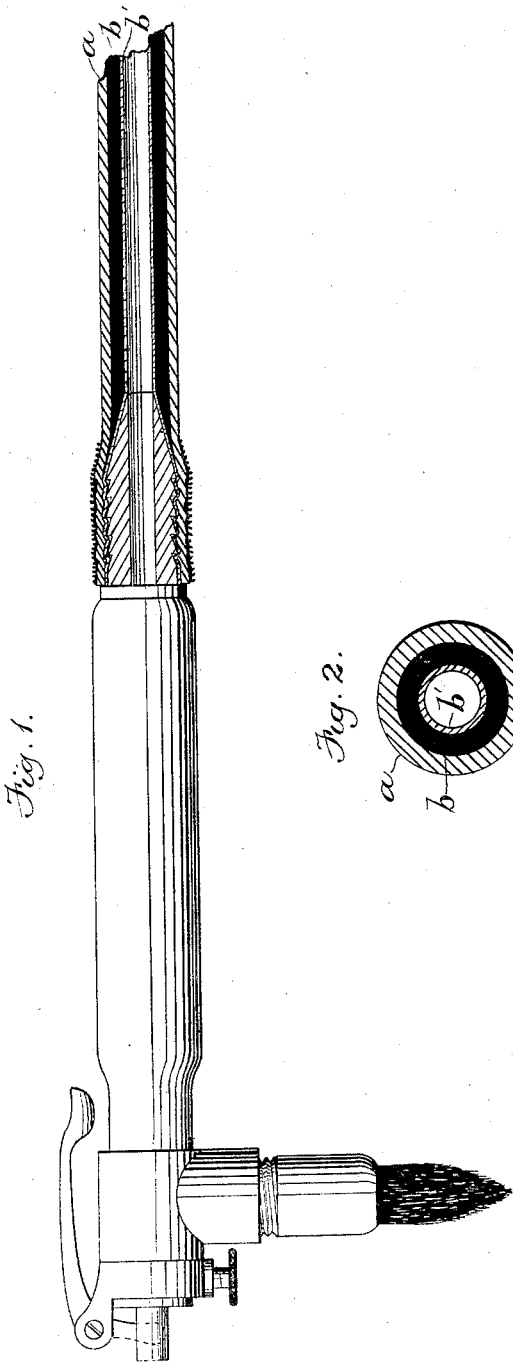
Figure 2:
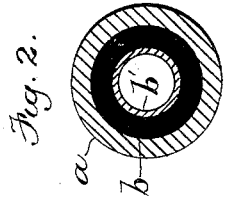
Figure 3:

Of the accompanying drawings, forming a part of this specification, Figure 1 represents a longitudinal section, and Fig. 2 represents a transverse section of a tube embodying my invention. Fig. 3 represents a side view of a part of the inner lining.

In the drawings, *a* represents a length of flexible tubing, which may be of vulcanized rubber alone, or vulcanized rubber having a woven textile lining or a woven textile covering; or said tube may be composed entirely of woven textile material alone.

*b* represents the naphtha-proof lining, composed of gelatine as a base, and molasses or other ingredient which will prevent the mixture from hardening. A mixture of two parts, by measure, of gelatine to one part, by measure, of molasses, produces good results.

*b'* represents the inner lining, which is applied to the inner surface of the lining *b* and constitutes the surface of the passage or conduit through the tube. The inner lining, *b'*, is made of leather—such as sheep-skin or calf-skin—by forming a strip of the leather into a tube, skiving its edges, winding it spirally into tubular form, and cementing its edges together, the spiral cemented seam giving the leather tube stiffness and preventing it from readily collapsing.

In forming the completed product the leather tube may be placed upon a suitable rod or support within the inclosing-tube *a*, an annular space being formed between the two, into which the mixture which forms the naphtha-proof lining is forced in a melted condition. When the mixture cools, it adheres closely to the inclosing-tube *a* and to the inner lining, *b'*, holding the latter securely in place, the completed article constituting a composite tube the parts of which are firmly united. The lining *b* arrests the naphtha which may be forced through the secondary lining by the air-pressure exerted on the contents of the supplying-reservoir, as described in the above-named Bradford patent, and also gives the tube as a whole sufficient body to prevent it from being bent abruptly at an angle, and thus flattened and obstructed. The secondary lining prevents the breaking away of any portions of the gelatinous lining, and enables a clearer to be inserted in the tube to remove obstructions without affecting or injuring the gelatinous lining.

The advantages of leather as a material for the inner lining are its strength and flexibility and its resistance to the destructive action of the cement, and while in these respects leather alone may be found sufficient as a material for the entire tube, it is very desirable to surround it with an air-excluding covering which will prevent the naphtha of the cement which finds its way to the outer surface of the leather tube from evaporating. Sometimes the tube is left full of cement, which is not allowed to pass off for a considerable length of time, and if the tube were composed only of leather the naphtha would be liable to evaporate through the pores of the leather, leaving the other ingredients of the cement in a nearly-solid form in the tube and completely clogging the passage. The gelatinous covering overcomes this defect in the leather. Said covering may be applied by dipping the leather tube into the melted mixture until enough adheres to its outer surface, or by winding strips of cloth or other material saturated with the mixture upon the leather tube.

The linings $b\ b'$ are preferably formed to fit the tapered end of the shank which holds the brush before alluded to.

I claim—

1. A flexible conductor composed of an inclosing-tube, a gelatinous lining within the inclosing-tube, and an inner lining within the gelatinous lining, composed of a strip of leather with scarfed edges wound spirally into a tube and forming the surface of the conduit through the tube, as set forth.

2. A flexible conductor for substances containing naphtha, composed of a strip of leather wound spirally into a tube, and having its edges scarfed, overlapped, and cemented together, whereby a spiral cemented joint is produced, imparting sufficient stiffness to the tube to prevent it from collapsing, a gelatinous naphtha-proof coating placed on the external surface of said tube, whereby the naphtha is prevented from passing through the pores of the leather, and an inclosing-tube covering said coating, as set forth.

In testimony whereof I have signed my name to this specification, in the presence of two subscribing witnesses, this 14th day of May, 1884.

GEORGE H. P. FLAGG.

Witnesses:
C. F. BROWN,
J. S. BELL.